(12) United States Patent
Kuwabara et al.

(10) Patent No.: US 12,032,368 B2
(45) Date of Patent: Jul. 9, 2024

(54) INFORMATION PROCESSING SYSTEM, INPUT DEVICE, RECORDER, COMPUTER-READABLE RECORDING MEDIUM, AND INFORMATION PROCESSING METHOD

(71) Applicant: YOKOGAWA ELECTRIC CORPORATION, Tokyo (JP)

(72) Inventors: Miyuki Kuwabara, Tokyo (JP); Masaaki Ogo, Tokyo (JP); Masayuki Uchida, Tokyo (JP); Moe Tokuoka, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 74 days.

(21) Appl. No.: 17/669,013

(22) Filed: Feb. 10, 2022

(65) Prior Publication Data

US 2022/0260986 A1 Aug. 18, 2022

(30) Foreign Application Priority Data

Feb. 17, 2021 (JP) ................................ 2021-023501

(51) Int. Cl.
*G05B 23/02* (2006.01)
*G05B 19/418* (2006.01)

(52) U.S. Cl.
CPC ..... *G05B 23/0264* (2013.01); *G05B 19/4183* (2013.01); *G05B 19/4185* (2013.01)

(58) Field of Classification Search
None
See application file for complete search history.

(56) References Cited

U.S. PATENT DOCUMENTS 10,169,539 B2 * 1/2019 Reihman ................ G16H 15/00
2016/0292051 A1 10/2016 Fujimoto et al.

FOREIGN PATENT DOCUMENTS

JP 2008-71157 A 3/2008
JP 2018-194892 A 12/2018
(Continued)

OTHER PUBLICATIONS

Rotronic, "Measuring & Monitoring Solutions for Various Parameters", 2020-V2 (Year: 2020).*
(Continued)

*Primary Examiner* — Carlos R Ortiz Rodriguez
(74) *Attorney, Agent, or Firm* — RANKIN, HILL & CLARK LLP

(57) ABSTRACT

An information processing system comprises an input device that holds measurement data and that transmits the measurement data to a recorder; the recorder that receives and records the measurement data transmitted by the input device; and an information processing device that generates, by using a recording result obtained by the recorder and complementary data including missing data corresponding to measurement data that is not included in the recording result obtained by the recorder but that is held by the input device, a new recording result in which the missing data was complemented, wherein the recorder transmits, to the input device, request information for requesting the complementary data, the input device receives the request information transmitted by the recorder and transmits the requested complementary data to the recorder, and the information processing device generates a new recording result by using the complementary data transmitted to the recorder by the input device.

6 Claims, 11 Drawing Sheets

(56) References Cited

FOREIGN PATENT DOCUMENTS

JP      2019-179005 A    10/2019
WO    2015/076168 A1   5/2015

OTHER PUBLICATIONS

Japanese Office Action (JPOA) dated Jan. 4, 2023 for Japanese Patent Application No. 2021-023501; English machine translation.

* cited by examiner

21a

| DEVICE IDENTIFICATION INFORMATION | DATA SEQUENCE NUMBER | MEASURE-MENT DATA |
|---|---|---|
| INPUT DEVICE 2A | 1 | 21.0°C |
| INPUT DEVICE 2A | 2 | 21.1°C |
| INPUT DEVICE 2A | 3 | 21.2°C |
| INPUT DEVICE 2A | 4 | 21.3°C |
| INPUT DEVICE 2A | 5 | 21.4°C |
| INPUT DEVICE 2A | 6 | 21.5°C |
| INPUT DEVICE 2A | 7 | 21.6°C |
| INPUT DEVICE 2A | 8 | 21.7°C |

| DEVICE IDENTIFICATION INFORMATION | DATA SEQUENCE NUMBER | MEASURE-MENT DATA |
|---|---|---|
| INPUT DEVICE 2A | 1 | 21.0°C |
| INPUT DEVICE 2A | 2 | 21.1°C |
| INPUT DEVICE 2A | 3 | 21.2°C |
| INPUT DEVICE 2A | 4 | 21.3°C |
| INPUT DEVICE 2A | 5 | 21.4°C |
| INPUT DEVICE 2A | 6 | 21.5°C |
| INPUT DEVICE 2A | 7 | 21.6°C |
| INPUT DEVICE 2A | 8 | 21.7°C |

(Rows 3–5 shaded: MISSING DATA)

FIG.6

| DEVICE IDENTIFICATION INFORMATION | DATA SEQUENCE NUMBER | MEASURE-MENT DATA | MISSING OCCURRENCE INFORMATION |
|---|---|---|---|
| INPUT DEVICE 2A | 1 | 21.0°C | |
| INPUT DEVICE 2A | 2 | 21.1°C | |
| INPUT DEVICE 2A | 2 | 21.1°C | |
| INPUT DEVICE 2A | 2 | 21.1°C | MISSING OCCURRENCE DETECTION |
| INPUT DEVICE 2A | 2 | 21.1°C | MISSING |
| INPUT DEVICE 2A | 6 | 21.5°C | RETURN DETECTION |
| INPUT DEVICE 2A | 7 | 21.6°C | |
| INPUT DEVICE 2A | 8 | 21.7°C | |

| TIME IN-FORMATION | DEVICE IDENTIFICATION INFORMATION | DATA SEQUENCE NUMBER | MEASURE-MENT DATA | MISSING OCCUR-RENCE IN-FORMATION |
|---|---|---|---|---|
| 00:01:00 | INPUT DEVICE A | 1 | 21.0°C | |
| 00:02:00 | INPUT DEVICE A | 2 | 21.1°C | |
| 00:03:00 | INPUT DEVICE A | 2 | 21.1°C | |
| 00:04:00 | INPUT DEVICE A | 2 | MISSING | MISSING |
| 00:05:00 | INPUT DEVICE A | 2 | MISSING | |
| 00:06:00 | INPUT DEVICE A | 6 | 21.5°C | RETURN DETECTION |
| 00:07:00 | INPUT DEVICE A | 7 | 21.6°C | |
| 00:08:00 | INPUT DEVICE A | 8 | 21.7°C | |
| ... | ... | ... | ... | ... |

FIG.8

| DEVICE IDENTIFICATION INFORMATION | DATA SEQUENCE NUMBER | |
|---|---|---|
| | START NUMBER | END NUMBER |
| INPUT DEVICE 2A | 2 | 8 |

34a

| DEVICE IDENTIFICATION INFORMATION | DATA SEQUENCE NUMBER | MEASURE- MENT DATA |
|---|---|---|
| INPUT DEVICE 2A | 2 | 21.1°C |
| INPUT DEVICE 2A | 3 | 21.2°C |
| INPUT DEVICE 2A | 4 | 21.3°C |
| INPUT DEVICE 2A | 5 | 21.4°C |
| INPUT DEVICE 2A | 6 | 21.5°C |
| INPUT DEVICE 2A | 7 | 21.6°C |
| INPUT DEVICE 2A | 8 | 21.7°C |

52a

| FILE LIST | STATE | MISSING DATA |
|---|---|---|
| RECORDING DATA FILE 33a-1 | WAITING FOR PROCESSING | DATA SEQUENCE NUMBERS 2 TO 6/ INPUT DEVICE 2A |
| RECORDING DATA FILE 33a-2 | WAITING FOR PROCESSING | DATA SEQUENCE NUMBERS aa TO bb/ INPUT DEVICE 2B<br>DATA SEQUENCE NUMBERS cc TO dd/ INPUT DEVICE 2A |
| ... | ... | ... |

| FILE LIST | COMPLEMENTARY AVAIRABLE DATA |
|---|---|
| COMPLEMENTARY DATA FILE 34a-1 | DATA SEQUENCE NUMBER 2 TO 8/ INPUT DEVICE A |
| COMPLEMENTARY DATA FILE 34a-2 | DATA SEQUENCE NUMBER aa TO bb+m/INPUT DEVICE B |
| COMPLEMENTARY DATA FILE 34a-3 | DATA SEQUENCE NUMBER cc TO dd+m/INPUT DEVICE B |
| ... | ... |

| RECORDING DATA ASSIGNMENT TIME | DEVICE IDENTIFICATION INFORMATION | DATA SEQUENCE NUMBER | MEASURE-MENT DATA | |
|---|---|---|---|---|
| 00:01:00 | INPUT DEVICE A | 1 | 21.0°C | |
| 00:02:00 | INPUT DEVICE A | 2 | 21.1°C | ⎫ |
| 00:03:00 | INPUT DEVICE A | 3 | 21.2°C | ⎪ |
| 00:04:00 | INPUT DEVICE A | 4 | 21.3°C | ⎬ COMPLE-MENTED DATA |
| 00:05:00 | INPUT DEVICE A | 5 | 21.4°C | ⎭ |
| 00:06:00 | INPUT DEVICE A | 6 | 21.5°C | |
| 00:07:00 | INPUT DEVICE A | 7 | 21.6°C | |
| 00:08:00 | INPUT DEVICE A | 8 | 21.7°C | |
| ... | ... | ... | ... | |

| RECORDING DATA FILE | STATE | MISSING DATA |
|---|---|---|
| RECORDING DATA FILE 33a-1 | COMPLETED | SEQUENCE NUMBERS 2 TO 6/ INPUT DEVICE A |
| RECORDING DATA FILE 33a-2 | WAITING FOR PROC- ESSING | SEQUENCE NUMBERS aa TO bb/ INPUT DEVICE 2B SEQUENCE NUMBERS cc TO dd/ INPUT DEVICE 2A |
| ... | ... | ... |

INFORMATION PROCESSING SYSTEM, INPUT DEVICE, RECORDER, COMPUTER-READABLE RECORDING MEDIUM, AND INFORMATION PROCESSING METHOD

CROSS-REFERENCE TO RELATED APPLICATION

The present application claims priority to and incorporates by reference the entire contents of Japanese Patent Application No. 2021-023501 filed in Japan on Feb. 17, 2021.

FIELD

The present invention relates to an information processing system, an input device, a recorder, a computer-readable recording medium, and an information processing method.

BACKGROUND

In the field of industrial measurement and the like, a system that includes an input device that acquires measurement data and a recorder that records the measurement data transmitted from the input device is known (for example, see Japanese Laid-open Patent Publication No. 2019-179005).

SUMMARY

In some cases, measurement data that is not recorded in the recorder (missing data) occurs caused by a communication failure between the input device and the recorder. On the other hand, the input device holds the measurement data, for example, for a temporary period of time. If the circumstances are within this range, it is possible to complement the missing data by acquiring the missing data from the input device. Until now, an operation of acquiring and complementing the missing data is manually performed by connecting a PC to the input device performed by, for example, a user. In consequence, a work burden is accordingly increased.

According to the present invention, it is possible to reduce a work burden placed on acquisition and complement of the missing data.

According to one aspect of embodiments, an information processing system comprises an input device that holds measurement data and that transmits the measurement data to a recorder; the recorder that receives and records the measurement data transmitted by the input device; and an information processing device that generates, by using a recording result obtained by the recorder and complementary data that includes missing data corresponding to measurement data that is not included in the recording result obtained by the recorder but that is held by the input device, a new recording result in which the missing data has been complemented; wherein the recorder transmits request information for requesting the complementary data to the input device, the input device receives the request information transmitted by the recorder and transmits the requested complementary data to the recorder, and the information processing device generates the new recording result by using the complementary data transmitted to the recorder by the input device.

According to one aspect of embodiments, an input device comprises a storage unit that holds measurement data; and a communication unit that transmits the measurement data to a recorder that records the measurement data, wherein the communication unit receives, from the recorder, request information for requesting complementary data that includes missing data corresponding to the measurement data that is not included in a recording result obtained by the recorder but that is held by the storage unit, and transmits the requested complementary data to the recorder.

According to one aspect of embodiments, a recorder comprises a communication unit that receives measurement data that is transmitted by an input device that holds and transmits the measurement data; and a recording unit that records the measurement data received by the communication unit, wherein the communication unit transmits, to the input device, request information for requesting complementary data that includes missing data corresponding to the measurement data that is not included in a recording result obtained by the recording unit but that is held by the input device.

According to one aspect of embodiments, a computer-readable recording medium stores therein an information processing program that causes a computer to execute a process comprising: generating, by using a recording result obtained by a recorder that receives and records measurement data that is transmitted by an input device that holds and transmits the measurement data, and by using complementary data that includes missing data corresponding to measurement data that is not included in the recording result obtained by the recorder but that is held by the input device, a new recording result in which the missing data has been complemented, wherein the recorder transmits, to the input device, request information for requesting the complementary data, the input device receives the request information transmitted by the recorder and transmits the requested complementary data to the recorder, and the generating includes generating the new recording result by using the complementary data transmitted to the recorder by the input device.

According to one aspect of embodiments, an information processing method comprising: holding, performed by an input device, measurement data and transmitting, performed by an input device, the measurement data to a recorder; receiving and recording, performed by the recorder, the measurement data transmitted by the input device; and generating, performed by an information processing device, by using a recording result obtained by the recorder and complementary data that includes missing data corresponding to measurement data that is not included in the recording result obtained by the recorder but that is held by the input device, a new recording result in which the missing data has been complemented, wherein the generating includes generating the new recording result by using the complementary data obtained by transmitting, performed by the recorder, request information for requesting the complementary data to the input device, and by transmitting, performed by the input device, the complementary data to the recorder in accordance with the request information.

BRIEF DESCRIPTION OF DRAWINGS

FIG. 5 is a diagram schematically illustrating missing data;

FIG. 6 is a diagram illustrating an example of measurement data collected by a collection unit;

FIG. 7 is a diagram illustrating an example of a recording data file;

FIG. 8 is a diagram illustrating an example of request information;

FIG. 13 is a diagram illustrating an example of a complementary data file list;

FIG. 14 is a diagram illustrating an example of backfill data file generated by a generating unit;

FIG. 15 is a diagram illustrating an example of an updated recording data file list;

DESCRIPTION OF EMBODIMENTS

Figure 1:
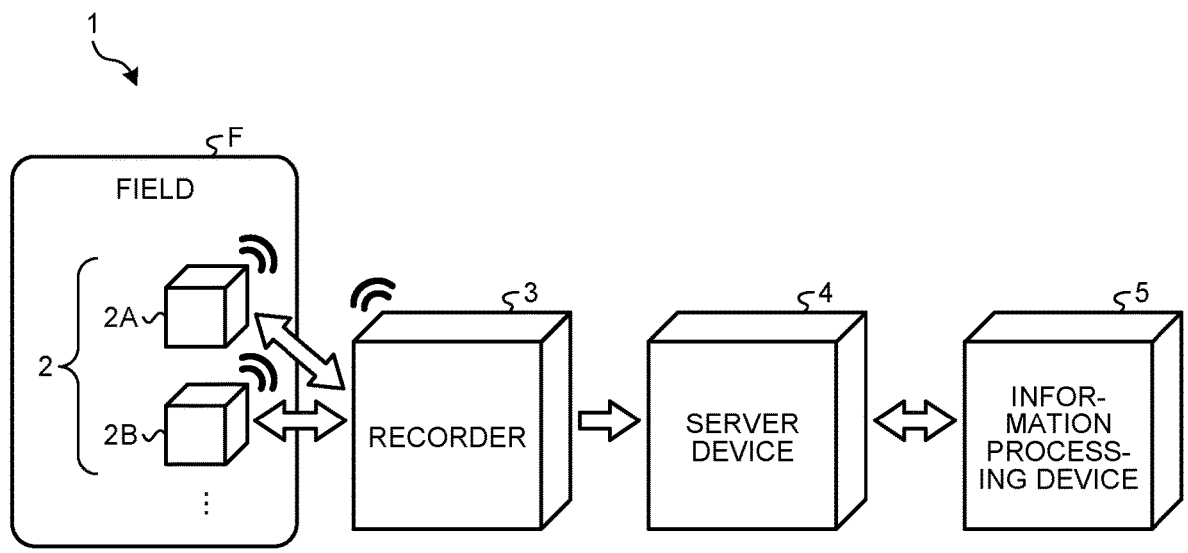
FIG. 1 is a diagram illustrating an example of a schematic configuration of an information processing system according to an embodiment.

Preferred embodiments of the present disclosure will be described below with reference to the drawings. Furthermore, the same components are denoted by the same reference numerals and an overlapping description will be omitted.

FIG. 1 is a diagram illustrating an example of a schematic configuration of an information processing system according to the embodiment. An information processing system 1 includes an input device 2, a recorder 3, a server device 4, and an information processing device 5. The input device 2 and the recorder 3 are able to perform communication with each other (able to transmit and receive data or the like). The recorder 3 and the server device 4 are able to perform communication with each other. The server device 4 and the information processing device 5 are able to perform communication with each other.

The input device 2 is used to input measurement data to the information processing system 1. In this example, a plurality of the input devices 2 are arranged in a field F and acquire measurement data (field data). In order to distinguish each of the input devices 2, the input devices 2 are illustrated in the drawing by being referred to as an input device 2A, an input device 2B, and the like. The input device 2 may be a battery powered device that is operated by using electrical power of a battery. Unlike the recorder 3 that will be described later, the input device 2 does not need to have a measurement function of time, such as a timer function.

The field F indicates at least a part of area in a facility or the like in which measurement data is measured. An example of the facility includes a plant. In such a case, the input device 2 is used as an industrial device that acquires measurement data related to, for example, the plant. Examples of the measurement data includes a voltage, an electric current, electrical power, magnetism, a temperature, humidity, a pressure, a velocity, a flow rate and a fluid volume of a fluid, and the like. Another example of the facility is a warehouse. In such a case, the input device 2 is used as a monitoring device of, for example, a temperature, humidity, and the like.

The input device 2 holds the measurement data and transmits the measurement data to the recorder 3. The input device 2 shifts (transitions) from a sleep state to an awake state (a state in which the sleep state is released) in accordance with a set period (an intermittent operation period), and performs an operation of, for example, acquiring, holding, and transmitting the measurement data. The awake state is a state in which an operation of, for example, acquiring, holding, and transmitting the measurement data is able to be immediately performed. The sleep state is a state in which this type of operation is not able to be immediately performed. Power consumption (for example, an idle current, etc.) is reduced in the sleep state as compared to a case of the awake state. The input device 2 will be described with reference to FIG. 2.

Figure 2:
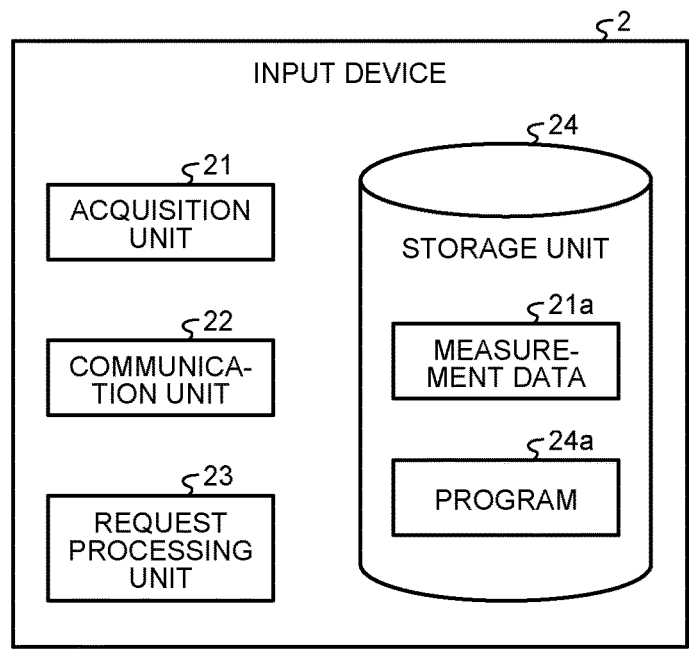
FIG. 2 is a diagram illustrating an example of a schematic configuration of an input device.

FIG. 2 is a diagram illustrating an example of a schematic configuration of the input device. The input device 2 includes an acquisition unit 21, a communication unit 22, a request processing unit 23, and a storage unit 24. As the information stored in the storage unit 24, measurement data 21a and a program 24a are exemplified.

The acquisition unit 21 acquires the measurement data. For example, the acquisition unit 21 acquires measurement results obtained from various measurement devices provided in the field F, detection results obtained from various sensor devices, and the like as the measurement data. These devices may be a component of the input device 2, or may be provided independently of the input device 2.

Figures 3, 4:
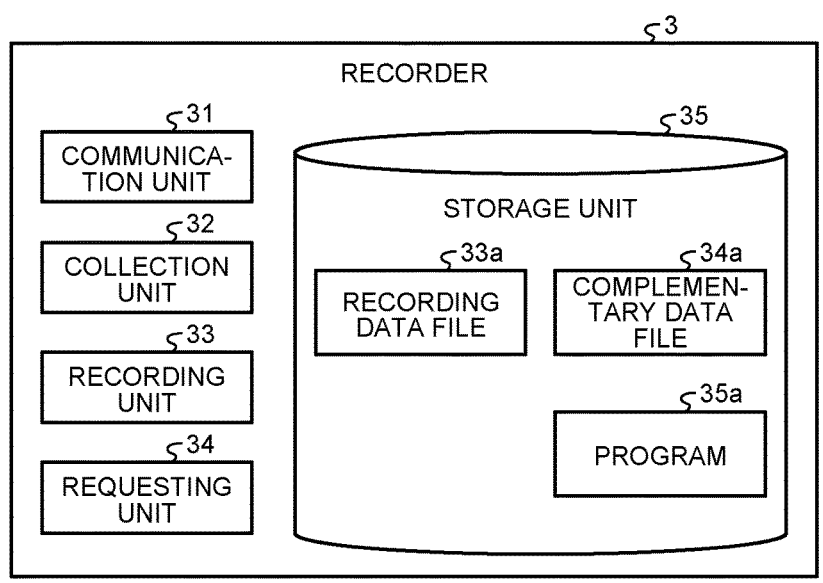
FIG. 3 is a diagram illustrating an example of measurement data acquired by an acquisition unit.
FIG. 4 is a diagram illustrating an example of a schematic configuration of a recorder.

FIG. 3 is a diagram illustrating an example of the measurement data acquired by the acquisition unit. The acquisition unit 21 acquires "device identification information", "data sequence number", and "measurement data" in an associated manner.

The "device identification information" is information (a device ID, etc.) for uniquely specifying each of the input devices 2. In this example, the device identification information is schematically illustrated as the input device 2A, or the like.

The "data sequence number" is a number that is used to uniquely specify the measurement data, and is measurement order information assigned in the order in which, for example, the pieces of measurement data are measured. In this example, the data sequence numbers are schematically illustrated as, for example, a data sequence number 1 to a data sequence number 8.

The "measurement data" is defined as described above, and is, in this example, a temperature (for example, an instantaneous value of the temperature).

As described above, the acquisition unit 21 sequentially acquires the pieces of measurement data with which the device identification information and the data sequence numbers are associated in a manner described above, and the storage unit 24 holds the associated measurement data. The storage unit 24 temporarily holds the measurement data. The number of pieces of the measurement data to be held is appropriately set in accordance with the storage capacity of the storage unit 24. The measurement data held by the storage unit 24 is referred to as the measurement data 21a and illustrated in the drawing.

A description will be given here by referring back to FIG. 2. The communication unit 22 is a transmission/reception unit that transmits and receives data to and from the recorder 3. For example, the communication unit 22 transmits the measurement data acquired by the acquisition unit 21 to the recorder 3 together with the data sequence number. A transmission interval may be the same as an acquisition interval of the measurement data acquired by the acquisition unit 21. Furthermore, the communication unit 22 also receives request information or the like received from the recorder 3. The details of the request information will be described later.

In one embodiment, the communication unit 22 wirelessly transmits and receives data. In such a case, the communication unit 22 is constituted by including a wireless device or the like. For the transmission and reception of data, for example, 920 MHz specified low power radio system is used. The communication unit 22 is also able to be switched between the sleep state and the awake state in conformity with the sleep state and the awake state of the input device 2 described above. In other words, the input device 2 is configured to be able to shift to the sleep state that includes a state in which power consumption of wireless transmission/reception is reduced, and is also configured to be able to release the sleep state.

The request processing unit 23 processes the request information or the like received from the recorder 3. The details thereof will be described later.

The storage unit 24 stores therein various kinds of information needed for the processes performed in the input device 2. Of the measurement data 21a and the program 24a exemplified as information to be stored, the measurement data 21a is as described above with reference to FIG. 3. The program 24a is a program (an input program or software) for causing a computer (for example, a processor installed in the input device 2) to execute a process of the input device 2.

A description will be given here by referring back to FIG. 1. The recorder 3 receives the measurement data received by the input device 2 and records the received measurement data. The recorder 3 will be described with reference to FIG. 4.

FIG. 4 is a diagram illustrating an example of a schematic configuration of the recorder. The recorder 3 includes a communication unit 31, a collection unit 32, a recording unit 33, a requesting unit 34, and a storage unit 35. As the information stored in the storage unit 35, a recording data file 33a, a complementary data file 34a, and a program 35a are exemplified.

The communication unit 31 is a transmission/reception unit that transmits and receives data to and from the input device 2. For example, the communication unit 31 receives the measurement data that has been transmitted by the communication unit 22 included in the input device 2. The communication unit 31 holds the received measurement data in an internal memory (not illustrated) included in the communication unit 31 until the communication unit 31 receives subsequent measurement data next time. Furthermore, the communication unit 31 transmits the request information or the like to the communication unit 22 included in the input device 2. The details thereof will be described later.

The communication unit 31 may be a wireless transmission/reception unit, similarly to the communication unit 22 included in the input device 2, and may be configured to include a wireless device, or the like. The wireless device in the communication unit 31 included in the recorder 3 and the wireless device in the communication unit 22 included in the input device 2 may have a relationship between a wireless master device and a wireless client device, respectively.

The collection unit 32 collects the measurement data transmitted by the input device 2. Specifically, the collection unit 32 acquires the measurement data that is received and held by the communication unit 31 and collects the measurement data. A collection interval of the measurement data performed by the collection unit 32 may be arbitrary set within a range in which the collection unit 32 is able to appropriately collect the measurement data transmitted by the communication unit 22 included in the input device 2. The input device 2 and the recorder 3 may be asynchronously (without performing time synchronization or the like) operated, the collection interval of the measurement data collected by the collection unit 32 may be different from the transmission interval of the measurement data transmitted by the input device 2.

Here, in the information processing system 1, there may be a case in which some of measurement data acquired by the acquisition unit 21 included in the input device 2 is not sometimes received by the communication unit 31 included in the recorder 3 due to a communication failure or the like between the communication unit 22 in the input device 2 and the communication unit 31 in the recorder 3. The measurement data that is not received by the communication unit 31 is referred to as "missing data". The missing data is not included in the recording results in the recorder 3, but is held by the storage unit 24 in the input device 2.

FIG. 5 is a diagram schematically illustrating the missing data. As the measurement data acquired by the acquisition unit 21 included in the input device 2, the pieces of measurement data each having one of the data sequence number 1 to the data sequence number 8 are exemplified. The pieces of measurement data each having one of the data sequence number 1, the data sequence number 2, and the data sequence number 6 to the data sequence number 8 are the measurement data received by the communication unit 31 included in the recorder 3. The pieces of measurement data each having one of the data sequence number 3 to the data sequence number 5 are the pieces of measurement data that are not received by the communication unit 31, i.e., missing data.

The collection unit 32 collects missing occurrence information (will be described later) indicating presence of the missing data described above in association with the measurement data.

FIG. 6 is a diagram illustrating an example of the measurement data collected by the collection unit. In this example, the collection interval of the measurement data is one minute. The pieces of measurement data each of which has one of the data sequence number 1, the data sequence number 2, and the data sequence number 6 to the data sequence number 8 are collected; however, the pieces of measurement data each of which has one of the data sequence number 3 to the data sequence number 5 are not collected. Instead of the measurement data each having one of the data sequence number 3 to the data sequence number 5, the pieces of measurement data that have the data sequence number 2 are continuously collected. This is because the communication unit 31 continuously hold the pieces of measurement data that have the data sequence number 2 in a period of time before the communication unit 31 receives the measurement data having the data sequence number 6 after receiving the measurement data having the data sequence number 2, and the measurement data having the data sequence number 2 is repeatedly acquired by the collection unit 32. As a result, here, the measurement data having the data sequence number 2 is consecutively collected four times.

The collection unit 32 collects, in an associated manner, "device identification information", "data sequence number", "measurement data", and "missing occurrence information". The "device identification information", the "data sequence number", and the "measurement data" are the same as those described above.

The "missing occurrence information" is information indicating presence of the missing data, and includes, in this example, "missing occurrence detection", "missing", and "return detection".

The "missing occurrence detection" indicates that an occurrence of the missing data has been detected (sensed). For example, if the device identification information and the data sequence numbers of the pieces of measurement data that are sequentially collected are not updated in a certain period of time, an occurrence of the missing data is detected. A certain period of time may appropriately be set in conformity with an operation. In this example, missing is detected at a timing at which a data sequence number is not updated in two minutes. Accordingly, the "missing occurrence detection" is associated with the measurement data that is collected third time out of the pieces of measurement data that have the data sequence number 2.

The "missing" indicates that the occurrence of the missing data is continued. Specifically, if the measurement data that has the data sequence number that is the same as the data sequence number attached to the measurement data with which the "missing occurrence detection" described above is associated is continuously collected, the "missing" is associated with that measurement data. In this example, the "missing" is associated with the measurement data that is collected fourth time out of the pieces of the measurement data that have the data sequence number 2. Furthermore, although not illustrated in the drawing, if the pieces of same measurement data are further continuously collected, the "missing" is also associated with these pieces of measurement data.

The "return detection" indicates that the end of the occurrence of the missing data has been detected. Specifically, if the measurement data having a data sequence number that is different from the data sequence number assigned to the measurement data with which the "missing occurrence detection" described above is associated is collected, the "return detection" is associated with that measurement data. In this example, "return detection" is associated with the measurement data that has the data sequence number 6.

A description will be given here by referring back to FIG. 4. The recording unit 33 records the measurement data received by the communication unit 31, more specifically, the measurement data collected by the collection unit 32 by associating the measurement data with the time information. The recording result of the recording unit 33 is referred to as the recording data file 33a and illustrated in the drawing.

FIG. 7 is a diagram illustrating an example of the recording data file. The recording data file 33a records, in an associated manner, the "time information", the "device identification information", the "data sequence number", the "measurement data", and the "missing occurrence information".

The "time information" indicates the time (recording time) at which the measurement data is recorded in the recording data file 33a. In this example, a recording interval is one minute. The recording interval of the measurement data recorded by the recording unit 33 may be the same as the collection interval of the measurement data collected by the collection unit 32.

The "device identification information", the "data sequence number", the "measurement data", and the "missing occurrence information" are as described above. Although not essential, in this example, the recording unit 33 makes a modification to the description of the "measurement data" and the "missing occurrence information". Specifically, the recording unit 33 describes the measurement data with which the "missing occurrence detection" and the "missing" are associated at the time of collection performed by the collection unit 32 last time (the fourth and the fifth measurement data from the top indicated in FIG. 6) as "missing". Furthermore, the recording unit 33 describes "missing occurrence information" associated with the measurement data with which the "missing occurrence detection" is associated at the time of collection performed by the collection unit 32 last time (the fourth measurement data from the top indicated in FIG. 6) as "missing". The recording unit 33 describes nothing in the "missing occurrence information" associated with the measurement data (the fifth measurement data from the top indicated in FIG. 6) with which "missing" is associated at the time of collection performed by the collection unit 32 last time.

Furthermore, although not illustrated in FIG. 7, the pieces of measurement data held by the different input devices 2 (for example, the input device 2A and the input device 2B) may also be included in the single piece of the recording data file 33a.

The recording unit 33 generates the recording data file 33a described above, and stores the recording data file 33a in a memory (not illustrated), such as an SD card, and uploads the recording data file 33a to the server device 4 by using the communication unit 31. For the upload, for example, a data transfer using an FTP is used. The recording unit 33 generates the recording data file 33a every time, for example, a certain number of the pieces of measurement data is collected by the collection unit 32. The generated plurality of pieces of recording data file 33a are uploaded to and accumulated in the server device 4.

A description will be given here by referring back to FIG. 4. The requesting unit 34 requests complementary data that is used to complement the missing data to the input device 2. The complementary data is data that includes the missing data. The complementary data may include the pieces of measurement data that are measured before and after the measurement of the missing data (the measurement data obtained before missing, and obtained at the time of return detection and after the detection). As a result, it is possible to secure sufficient complementary data as compared to a case where, for example, only the measurement data obtained after the missing data is detected is used as the complementary data, and it is thus possible to complements the missing data without omission. Even when the input device 2 and the recorder 3 are asynchronous, it is possible to more reliably secure the complementary data by taking into consideration of a shift in timing. For example, it is useful to complement the missing data including the time information performed by a generating unit 53 included in the information processing device 5 that will be described later with reference to FIG. 11.

In the following, the range of the complementary data will be described. The complementary data includes pieces of data from the measurement data located at a complementary start reference position in a complementary process, which will be described in detail later, to the measurement data located at a complementary end reference position. The measurement data located at the complementary start reference position is the measurement data located at a recording position at which the measurement data that is obtained before an occurrence of the missing is recorded. The measurement data located at the complementary end reference position is the measurement data with which the "return detection" is associated.

Specifically, if a description will be made by using the example illustrated in FIG. 6 that has been described above, the measurement data located at the complementary start reference position is the measurement data having the data sequence number 2. The measurement data located at the complementary end reference position is the measurement data having the data sequence number 6. Therefore, the complementary data includes the pieces of measurement data having the data sequence number 2 to the data sequence number 6. Furthermore, the complementary data may also be the measurement data having one of the data sequence number 1 to the data sequence number 7.

In order to more reliably obtain sufficient complementary data, the complementary data may include the measurement data located after the measurement data with which the "return detection" is associated. For example, the complementary data may include the measurement data that is located after m pieces of measurement data from the measurement data with which the "return detection" is associated, where m is an integer that is larger than or equal to one. If a description will be made by using the example illustrated in FIG. 6 that has been described above, for example, if m=2, the complementary data includes the pieces of measurement data each having one of the data sequence number 2 to the data sequence number 8. Furthermore, the complementary data may include the measurement data that is located before the measurement data with which the "missing occurrence detection" is associated.

The requesting unit 34 generates request information (request command) for requesting the complementary data described above.

FIG. 8 is a diagram illustrating an example of the request information. The request information describes the "device identification information" in association with the "data sequence number". The "data sequence number" is described by using a "start number" (complementary start reference position) and an "end number" (complementary end reference position). By using this type of request information, the measurement data to be included in the requested complementary data is uniquely specified. In this example, the pieces of measurement data that have one of the data sequence number 2 to the data sequence number 8 and that are held in the input device 2A are requested as the complementary data.

A description will be given here by referring back to FIG. 4. The communication unit 31 holds the request information generated by the requesting unit 34 and transmits the request information to the communication unit 22 included in the input device 2 at an appropriate timing. The transmission of the request information is performed when the input device 2 releases the sleep state (at the time of the awake state).

The transmission timing of the request information is determined by a cooperation between the input device 2 and the recorder 3.

The request processing unit 23 included in the input device 2 performs control of the input device 2 so as to receive and process the request information described above with reference to FIG. 2 and FIG. 4. Specifically, the request processing unit 23 generates the reception available notification information (a reception available notification command) at a timing at which, for example, the input device 2 releases the sleep state at an on-and-off interval by thinning out an awake interval (intermittent operation period) of the input device 2. The reception available notification information is information for notifying a state in which the request information is able to be received. The communication unit 22 transmits the generated reception available notification information to the communication unit 31 included in the recorder 3.

The communication unit 31 included in the recorder 3 receives the reception available notification information that is transmitted by the input device 2 included in the input device 2. The communication unit 31 transmits the holding request information to the communication unit 22 included in the input device 2 in response to the reception of the reception available notification information. If the communication unit 31 does not have the holding request information, the communication unit 31 transmits request absence information (a request absence command) for notifying the communication unit 22 included in the input device 2 of this state.

The communication unit 22 included in the input device 2 receives the request information or the request absence information that is transmitted by the communication unit 31 included in the recorder. If the communication unit 22 receives the request information, the request processing unit 23 determines whether or not the request information is a request with respect to the own input device 2 (for example, the input device 2A). This determination is performed on the basis of, for example, the device identification information indicated by the request information (FIG. 8). If the request information is a request with respect to the own input device 2, the request processing unit 23 acquires the requested complementary data from the storage unit 24. The communication unit 22 transmits the complementary data acquired by the request processing unit 23 to the communication unit 31 included in the recorder 3. After that, the input device 2 shifts to the sleep state. Furthermore, if the communication unit 22 receives the request absence information, acquisition of data to be performed by the request processing unit 23 and transmission of data to be performed by the communication unit 22 are not performed in response to the received request absence information, and the communication unit 22 shifts to the sleep state.

The communication unit 31 included in the recorder 3 receives the complementary data that has been transmitted by the communication unit 22 included in the input device 2. Holding of the request information that is already transmitted is ended (cleared from the internal memory). The requesting unit 34 acquires the complementary data received by the communication unit 31. In addition, if the communication unit 31 has not yet received the complementary data, information indicating that the complementary data has not been received is sent as a reply from the communication unit 31 to the requesting unit 34. If the requesting unit 34 acquires the complementary data from the communication unit 31, the requesting unit 34 generates a data file including the acquired complementary data. The data file to be generated is referred to as the complementary data file 34a and illustrated in the drawing.

Figures 9, 10:
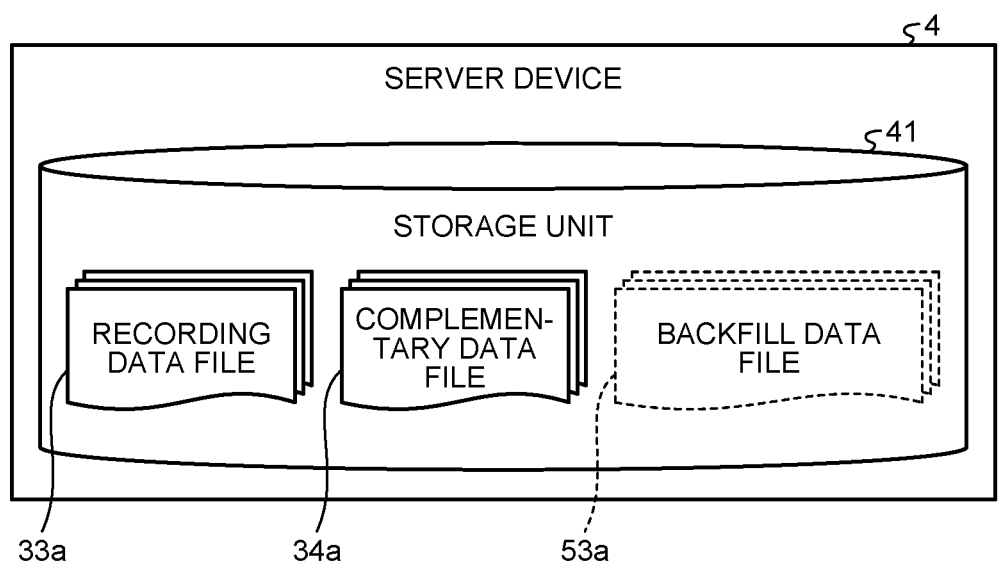
FIG. 9 is a diagram illustrating an example of complementary data file.
FIG. 10 is a diagram illustrating an example of a schematic configuration of a server device.

FIG. 9 is a diagram illustrating an example of the complementary data file. The exemplified complementary data file 34a is the complementary data requested by the request information described above with reference to FIG. 8 and includes the pieces of measurement data each having one of the data sequence number 2 to the data sequence number 8.

The requesting unit 34 generates the complementary data file 34a described above, and stores the complementary data file 34a in an SD card or uploads the complementary data file 34a to the server device 4. The requesting unit 34 generates the complementary data file 34a every time the requesting unit 34 acquires the complementary data requested by using the request information. The plurality of pieces of generated complementary data file 34a are uploaded to and accumulated in the server device 4.

A description will be given here by referring back to FIG. 4. The storage unit 35 stores therein various kinds of information needed for the processes performed in the recorder 3. Of the recording data file 33a, the complementary data file 34a, and the program 35a exemplified as the information to be stored, the recording data file 33a and the complementary data file 34a are the same as those described above with reference to FIG. 7 and FIG. 9, respectively. The program 35a is a program (a recording program or software) that causes a computer (for example, a processor installed in the recorder 3) to execute a process of the recorder 3.

A description will be given here by referring back to FIG. 1. The server device 4 is a device (for example, a data server) that has a function for delivering information to and from the recorder 3 and the information processing device 5.

FIG. 10 is a diagram illustrating an example of a schematic configuration of the server device. As a main functional block of the server device 4, a storage unit 41 is exemplified. The storage unit 41 stores therein various kinds of information delivered to and from the recorder 3 and the information processing device 5. As the information stored in the storage unit 41, the recording data file 33a, the complementary data file 34a, and a backfill data file 53a are exemplified. The recording data file 33a and the complementary data file 34a are generated by the recording unit 33 and the requesting unit 34, respectively, that are included in the recorder 3 as described above, and are stored in the storage unit 41 by being uploaded to the server device 4. The backfill data file 53a will be described later.

In a description below, a state in which data is stored in the storage unit 41 included in the server device 4 is sometimes referred to as a state in which data is uploaded to the server device 4.

A description will be given here by referring back to FIG. 1. The information processing device 5 performs the complementary process at a periodic or specified timing. The complementary process includes a process of generating a new recording result in which the missing data has been complemented by using the recording result obtained by the recorder 3 and using the complementary data. The recording result obtained by the recorder 3 and the complementary data are, in this example, the recording data file 33a and the complementary data file 34a, respectively, that are uploaded to the server device 4.

Figures 11, 12:
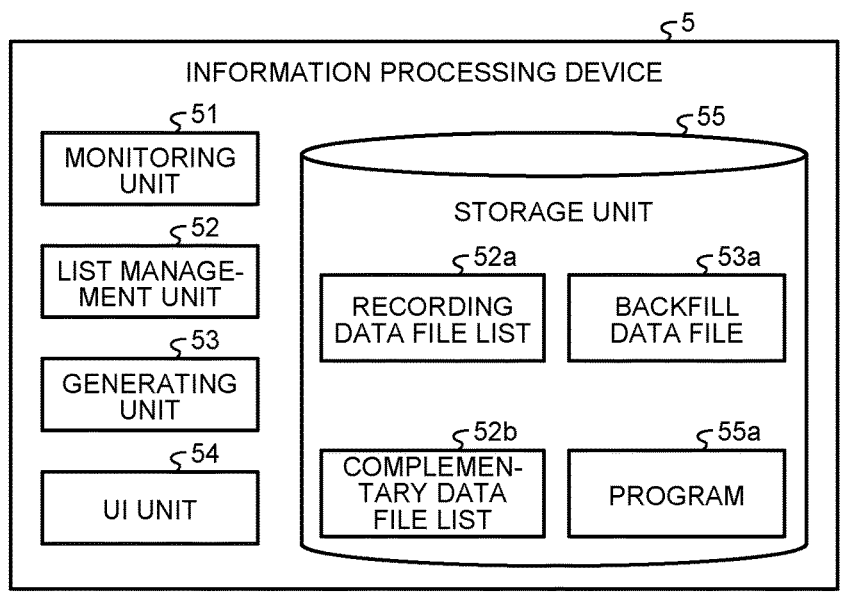
FIG. 11 is a diagram illustrating an example of a schematic configuration of an information processing device.
FIG. 12 is a diagram illustrating an example of a recording data file list.

FIG. 11 is a diagram illustrating an example of a schematic configuration of the information processing device. The information processing device 5 includes a monitoring unit 51, a list management unit 52, the generating unit 53, an UI unit 54, and a storage unit 55. As the information stored in the storage unit 55, a recording data file list 52a, a complementary data file list 52b, the backfill data file 53a, and a program 55a are exemplified.

The monitoring unit 51 monitors the recording result obtained by the recorder 3. For example, the monitoring unit 51 periodically accesses the server device 4, and monitors the recording data file 33a that is stored in the storage unit 41. An example of monitoring the recording data file 33a is whether the recording data file 33a that is newly uploaded to the server device 4 (added to the storage unit 41) is present. Furthermore, the monitoring unit 51 also monitors the complementary data file 34a. An example of monitoring of the complementary data file 34a is whether the complementary data file 34a that is newly uploaded to the server device 4 is present.

The list management unit 52 lists, out of the recording data files 33a monitored by the monitoring unit 51, the recording data file 33a that includes the missing data, more specifically, the recording data file 33a that includes the missing occurrence information, and manages the listed data. The management list of the recording data files 33a is referred to as the recording data file list 52a and illustrated in the drawing.

FIG. 12 is a diagram illustrating an example of the recording data file list. The recording data file list 52a describes, in an associated manner, "file list", "state", and "missing data".

The "file list" is a list of the recording data files 33a that are uploaded to the server device 4. As described above, the plurality of recording data files 33a are uploaded to the server device 4. The recording data files 33a are listed so as to be distinguishable, and are schematically illustrated as, in this example, a "recording data file 33a-1", and the like.

The "state" indicates a complementary state (a progress of the complementary process) of the recording data files 33a. If the complementary process has been completed, a state of "completed" is described, and, if the complementary process has not been completed, a state of "waiting for processing" is described. In this example, in each of the recording data file 33a-1 and a recording data file 33a-2, the complementary process has not been completed, and thus, "waiting for processing" is described.

The "missing data" is missing data occurring in the recording data file 33a. In this example, the missing data is uniquely specified on the basis of a combination between the data sequence number and the device identification information. The missing data in the recording data file 33a-1 is the pieces of measurement data each having one of the data sequence number 2 to the data sequence number 6 held by the input device 2A. The missing data in the recording data file 33a-2 is schematically illustrated as data sequence numbers aa and bb held by the input device 2B and data sequence numbers cc and dd held by the input device 2A. In the recording data file 33a-2, two missing periods (a period of time for which the missing data occurs) associated with the data sequence numbers aa and bb in the input device 2B and the data sequence numbers cc and dd held by the input device 2A are present.

A description will be given here by referring back to FIG. 11. The list management unit 52 also lists the complementary data files 34a monitored by the monitoring unit 51 and manages the listed complementary data files 34a. The management list of the complementary data files 34a is referred to as the complementary data file list 52b and illustrated in the drawing.

FIG. 13 is a diagram illustrating an example of the complementary data file list. The complementary data file list 52b describes "file list" and "complement available data" in an associated manner.

The "file list" is a list of the complementary data files 34a that are uploaded to the server device 4. As described above, the plurality of complementary data files 34a are uploaded to and accumulated in the server device 4. The complementary data files 34a are listed so as to be distinguishable, and are schematically illustrated as, in this example, a "complementary data file 34a-1", and the like.

The "complement available data" is, out of the pieces of complementary data, measurement data that is able to be used to complement the missing data. In this example, the complement available data is uniquely specified on the basis of a combination between the data sequence number and the device identification information. The complement available data in the complementary data file 34a-1 is the pieces of measurement data each having one of the data sequence number 2 to the data sequence number 8 held by the input device 2A and is able to be used to complement the missing data in the recording data file 33a-1 illustrated in FIG. 12 described above. The complement available data in a complementary data file 34a-2 is the pieces of measurement data each having one of the data sequence number aa to the data sequence number bb+m held by the input device 2B, and is able to be used to complement the missing data each having one of the data sequence numbers aa and bb held by the input device 2B out of the missing data in the recording data file 33a-2 illustrated in FIG. 12 described above. The complement available data in a complementary data file 34a-3 is the pieces of measurement data each having one of the data sequence numbers cc and dd+m held by the input device 2A and is able to be used to complement the missing data each having one of the data sequence numbers cc and dd held by the input device 2A out of the missing data in the recording data file 33a-2 illustrated in FIG. 12 described above.

A description will be given here by referring back to FIG. 11. The generating unit 53 generates, within the range in which complement is available, a new recording result (a new recording data file) in which the missing data has been complemented by using the recording data file 33a and the complementary data file 34a. The recording result that is to be newly generated is referred to as the backfill data file 53a and illustrated in the drawing.

For example, the generating unit 53 searches the complementary data file list 52b for the complementary data file 34a that includes, as the complement available data, the missing data that is included in the recording data file 33a, that is newly found by the monitoring unit 51, and that is added to the recording data file list 52a. For example, the complementary data file 34a that includes the measurement data having the same device identification information and the same data sequence number as those of the missing data is searched. The generating unit 53 generates the backfill data file 53a by using the newly found recording data file 33a and the searched complementary data file 34a.

For example, the generating unit 53 searches the recording data file list 52a for the recording data file 33a that includes the missing data that is able to be complemented by the complement available data that is included in the complementary data file 34a, that is newly found by the monitoring unit 51, and that is added to the complementary data file list 52b. For example, the recording data file 33a in which the measurement data having the same device identification information and the same data sequence number as those of the measurement data included in the complementary data file 34a is the missing data is searched. The backfill data file 53a generates the backfill data file 53a by using the searched recording data file 33a and the newly found complementary data file 34a.

Here, there may be a case in which two or more of the complementary data files 34a are used to complement the missing data in a single piece of the recording data file 33a. For example, in the recording data file 33a-2 illustrated in FIG. 12 described above, two missing periods associated with the data sequence numbers aa and bb held by the input device 2B and the data sequence numbers cc and dd held by the input device 2A are present. In order to complement the missing data in each of the missing periods, the complementary data file 34a-2 and the complementary data file 34a-3 illustrated in FIG. 13 described above are used.

In this case, first, the generating unit 53 generates, by using the recording data file 33a and using the complementary data file 34a that includes, as the complement available data, the missing data that occurs in some of the missing periods out of the plurality of missing periods and that is stored in the recording data file 33a, the backfill data file 53a in which the missing data in some of the missing periods has been completed as the backfill data file 53a that is in the course of the complementary process. After that, the generating unit 53 complements the missing data in the backfill data file 53a that is in the course of the complementary process by using the complementary data file 34a that includes the missing data in another missing period as the complement available data. In other words, the backfill data file 53a is updated and an update of the backfill data file 53a is repeated until all of the pieces of the missing data occurring in the missing periods are complemented. The backfill data file 53a that is in the course of the complementary process may also be stored in the storage unit 55 or may also be stored in the storage unit 41 in the server device 4.

The complementary process is performed by combining the recording data file 33a and the complementary data file 34a. The measurement data associated with the complementary data file 34a is allocated to the missing period in the recording data file 33a, and then, the missing data is complemented.

In one embodiment, the generating unit 53 generates the backfill data file 53a by combining the recording data file 33a and the complementary data file 34a such that the data sequence numbers of the pieces of measurement data that are measured before and after the measurement of the missing data are matched with the data sequence numbers recorded in the recording data file 33a. Specifically, the generating unit 53 allows the data sequence number of the measurement data at the complementary start reference position and the data sequence number of the measurement data at the complementary end reference position located at the recording data file 33a to be matched with the data sequence number of the measurement data at the complementary start reference position and the data sequence number of the measurement data at the complementary end reference position located at the complementary data file 34a, and then, complements between the matched data sequence numbers by using the complementary data recorded in the complementary data file 34a. The pieces of measurement data located between the complementary start reference position and the complementary end reference position are described by using the complementary data. At this time, the missing data may be complemented such that the missing data is linearly (equally) allocated to the missing period indicated in the recording data file 33a. The time that is associated with a period of time obtained by equally dividing a period of time between the time that is indicated by the time information associated with the measurement data located at the complementary start reference position and the time that is indicated by the time information associated with the measurement data located at the complementary end reference position by the number of pieces of the complemented complementary data is described as the time information on the complemented measurement data. Furthermore, the pieces of measurement data located at the complementary start reference position and the complementary end reference position are not complemented.

FIG. 14 is a diagram illustrating an example of a backfill data file generated by the generating unit. The "recording data assignment time" is associated with the "time information" recorded in the recording data file 33a. The exemplified backfill data file 53a is generated by using both of the recording data file 33a-1 illustrated in FIG. 12 and the complementary data file 34a-1 illustrated in FIG. 13 described above. The measurement data located at the complementary start reference position is the measurement data having the data sequence number 2. The measurement data located at the complementary end reference position is the measurement data having the data sequence number 6. The pieces of missing data are complemented such that the pieces of missing data (the pieces of measurement data each having one of the data sequence number 3 to the data sequence number 5) included in the complementary data file 34a-1 are associated with the time that is equally allocated to the missing period recorded in the recording data file 33a.

According to the combination algorithm described above, all of the pieces of missing data are complemented without performing time synchronization between the input device 2 and the recorder 3. Even if the input device 2 does not grasp the time information, the time information is associated with the missing data on the basis of the time information that is grasped by the recorder 3 and is recorded together with the measurement data. As a result, it is possible to complement the missing data associated with the time information while absorbing (correcting) an error (for example, a clock error) or the like caused by an asynchronous state with respect to time.

The generating unit 53 generates the backfill data file 53a described above and uploads the generated backfill data file 53a to the server device 4. The generating unit 53 generates the number of the backfill data files 53a in accordance with the number of the recording data files 33a in which the complementary process is needed. The plurality of generated backfill data files 53a are uploaded to and accumulated in the server device 4.

A description will be given here by referring back to FIG. 11. The list management unit 52 updates the list management unit 52 in a case where the recording data file 33a in which the complementary process has been completed by the generating unit 53 is present.

FIG. 15 is a diagram illustrating an example of the updated recording data file list. As compared to the recording data file list 52a illustrated in FIG. 12 described above, the state of the recording data file 33a-1 is changed from the "waiting for processing" to the "completed". The associated "needed complementary data" become unneeded, and that part is illustrated in the drawing by using hatching lines in order to provide easier understanding thereof.

A description will be given here by referring back to FIG. 11. The UI unit 54 is a user interface that sends and receives information to and from a user. For example, the UI unit 54 reads the recording data file 33a, the complementary data file 34a and/or the backfill data file 53a uploaded to the server device 4 in accordance with an operation performed by the user, and displays the read information in various formats. An example of the format includes a trend display, a digital (values, etc.) display, and the like. For example, a recording result in which the missing data has been complemented obtained by the recorder 3 is provided by a display of the backfill data file 53a.

The storage unit 55 stores therein various kinds of information needed for the process performed in the information processing device 5. Of the recording data file list 52a, the complementary data file list 52b, the backfill data file 53a, and the program 55a exemplified as the information to be stored, the recording data file list 52a, the complementary data file list 52b, and the backfill data file 53a are the same as those described with reference to FIG. 12 to FIG. 14. The program 55a is a program (an information processing program or software) that causes a computer to execute a process of the information processing device 5. For example, the program 55a is application software that causes a general-purpose PC or the like to perform a process of the information processing device 5.

Figure 16:
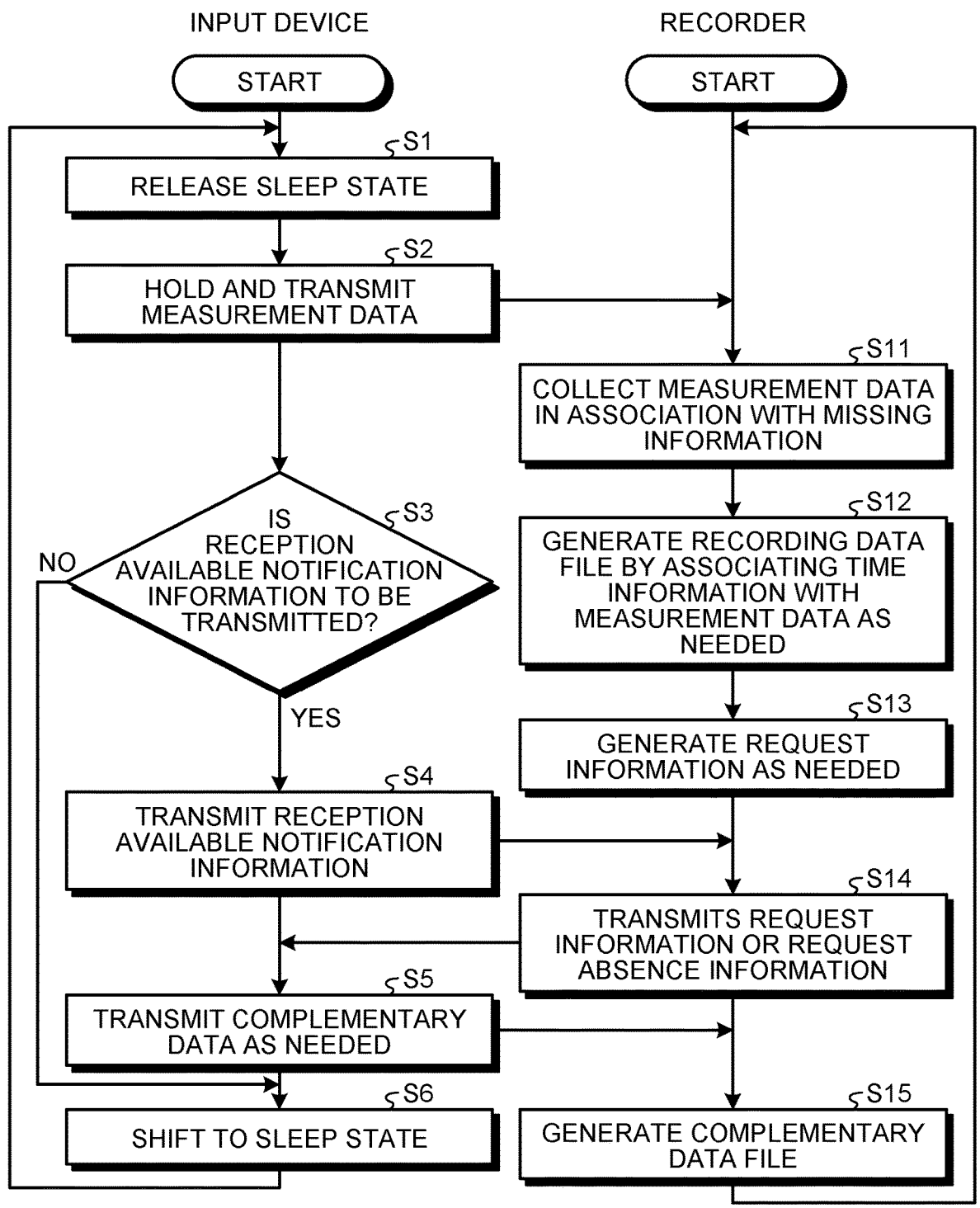
FIG. 16 is a flowchart illustrating an example of a process performed in the information processing system.
Figure 17:
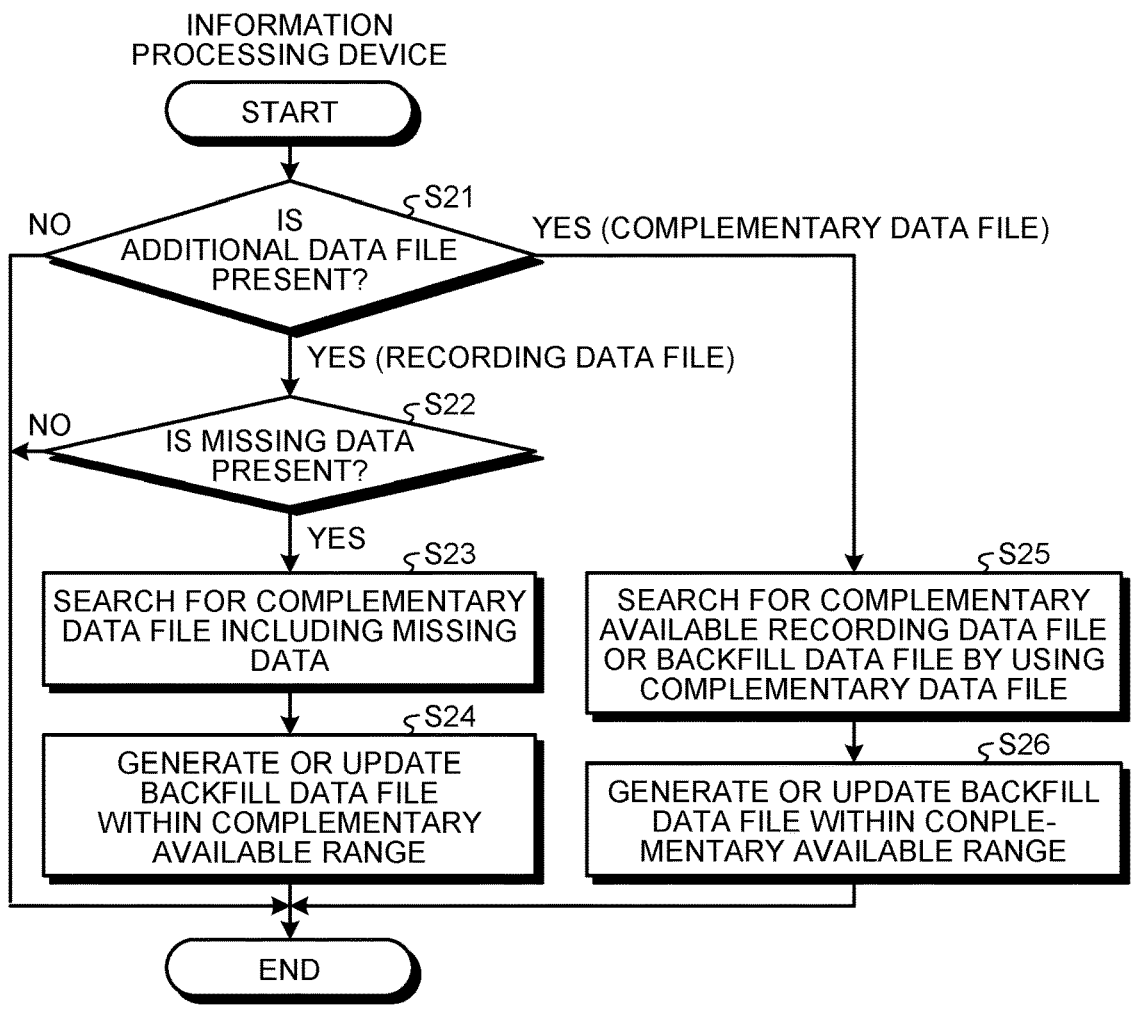
FIG. 17 is a flowchart illustrating an example of a process performed in the information processing system.

FIG. 16 and FIG. 17 are flowcharts each illustrating an example of a process (information processing method) performed in the information processing system. Specific content of each of the processes is the same as that described above; therefore, descriptions in detail will be omitted. The processing flow illustrated in FIG. 16 and the processing flow illustrated in FIG. 17 are independently performed.

FIG. 16 illustrates an example of the process performed by each of the input device 2 and the recorder 3.

At Step S1, the input device 2 releases the sleep state. The input device 2 shifts the state from the awake state to the sleep state. This shift is performed in conformity with the intermittent operation period of the input device 2.

At Step S2, the input device 2 holds the measurement data and transmits the measurement data. The acquisition unit 21 acquires the measurement data, the storage unit 24 holds the measurement data, and the communication unit 22 transmits the measurement data to the communication unit 31 included in the recorder 3. The communication unit 31 receives the measurement data. However, as described above, the missing data is not received by the communication unit 31.

At Step S11, the recorder 3 collects the received measurement data in an associated manner with the missing occurrence information. The collection unit 32 collects the data, which is received and held by the communication unit 31, in an associated manner with the missing occurrence information.

At Step S12, the recorder 3 generates the recording data file by also associating, as needed, the time information with the measurement data. If, for example, a certain number of pieces of measurement data is collected by the collection unit 32, the recording unit 33 generates the recording data file 33a by associating the time information with the collected measurement data.

At Step S13, the recorder 3 generates the request information as needed. If the recording data file 33a includes the missing occurrence information, the requesting unit 34 generates the request information for requesting the complementary data. The communication unit 31 holds the generated request information.

At Step S3, the input device 2 determines whether or not the reception available notification information is transmitted. If it is a timing that is the on-and-off interval by thinning out the intermittent operation period of the input device 2 described above, the requesting unit 34 determines that the reception available notification information is to be transmitted. If the reception available notification information is transmitted (Yes at Step S3), the input device 2 proceeds the process to Step S4. If not (No at Step S3), the input device 2 proceeds to the process at Step S6.

At Step S4, the input device 2 transmits the reception available notification information. The request processing unit 23 generates the reception available notification information, and the communication unit 22 transmits the generated reception available notification to the communication unit 31 in the recorder 3. The communication unit 31 receives the reception available notification.

At Step S14, the recorder 3 transmits the request information or the request absence information. If the communication unit 31 holds the request information, the communication unit 31 transmits the request information to the communication unit 22 included in the input device 2, and, if not, the communication unit 31 transmits the request absence information. The communication unit 22 receives the request information.

At Step S5, the input device 2 transmits, as needed, the complementary data. If the request information is received, the request processing unit 23 acquires the requested complementary data from the storage unit 24. The communication unit 22 transmits the complementary data to the communication unit 31 included in the recorder 3. The communication unit 31 receives the complementary data.

Furthermore, the complementary data may be transmitted multiple times in accordance with a limit amount of information (a data volume, etc.) that can be transmitted and received at a time. In such a case, transmission and reception of the request information and the complementary data performed between the recorder 3 and the input device 2 are repeated until all of the pieces of requested complementary data are transmitted.

At Step S6, the input device 2 shifts to the sleep state. The input device 2 shifts the state from the awake state to the sleep state. After that, the input device 2 returns to the process at Step S1.

At Step S15, the recorder 3 generates the complementary data file. The requesting unit 34 acquires the complementary data that is received by the communication unit 31, and then, generates the complementary data file 34a. After that, the recorder 3 returns the process to Step S11.

FIG. 17 illustrates an example of a process performed by the information processing device 5. The process performed by the information processing device 5 is repeatedly performed at a predetermined set interval independently of the process described above with reference to FIG. 16.

At Step S21, the information processing device 5 determines whether or not an additional data file is present. If the monitoring unit 51 included in the information processing device 5 finds the recording data file 33a and/or the complementary data file 34a that is newly uploaded to the server device 4, the monitoring unit 51 determines that the additional data file is present. If the additional data file is present (Yes at Step S21), if the additional data file is the recording data file 33a, the process proceeds to Step S22, and, if the additional data file is the complementary data file 34a, the process proceeds to Step S25. If the additional data file is not present (No at Step S21), the process illustrated in the flowchart ends.

Furthermore, if the additional data file is the recording data file 33a and also includes the missing occurrence information, the list management unit 52 adds the recording data file 33a to the recording data file list 52a. If the additional data file is the complementary data file 34a, the list management unit 52 adds the complementary data file 34a to the complementary data file list 52b.

At Step S22, the information processing device 5 determines whether or not the missing data is present. For example, if the recording data file 33a is added to the recording data file list 52a by the list management unit 52, the list management unit 52 or the generating unit 53 determines that the missing data is present in the recording data file 33a. If the missing data is present (Yes at Step S22), the process proceeds to Step S23. If not (No at Step S22), the process illustrated in the flowchart ends.

At Step S23, the information processing device 5 searches for the complementary data file including the missing data. The generating unit 53 searches the complementary data file list 52b for the complementary data file 34a that includes, as the complement available data, the missing data recorded in the recording data file 33a listed in the recording data file list 52a.

At Step S24, the information processing device 5 generates or updates the backfill data file within the range in which complement is available. The generating unit 53 generates or updates the backfill data file 53a in which the missing data has been complemented by using both of the added recording data file 33a and the searched complementary data file 34a. As described above, an update is performed in a case where two or more of the complementary data files 34a are used to complement the missing data in a single piece of the recording data file 33a. After the process at Step S24 has been completed, the process illustrated in the flowchart ends.

At Step S25, the information processing device 5 searches for the recording data file or the backfill data file that can be complemented by using the complementary data file. The generating unit 53 searches the recording data file list 52a for the recording data file 33a having the missing data that can be complemented by the complement available data in the complementary data file 34a indicated by the complementary data file list 52b. Or alternatively, the generating unit 53 searches the storage unit 55 or the storage unit 41 in the server device 4 for the backfill data file 53a that is in the course of the complementary process and in which the subject missing data is present.

At Step S26, the information processing device 5 generates or updates the backfill data file in the range in which complement is available. The generating unit 53 generates or updates the backfill data file 53a in which the missing data has been complemented, by using the searched recording data file 33a or the backfill data file 53a and using the added complementary data file 34a. After the process at Step S26 has been completed, the process illustrated in the flowchart ends.

It is possible to reduce a work burden placed on the acquisition and complement of the missing data as a result of acquisition and complement of the missing data being automatically performed by using, for example, the process described above. The input device 2 transmits a reception available notification to the recorder 3, and then, the recorder 3 transmits the request information to the input device 2, so that the input device 2 does not need to continuously release the sleep state and continuously wait the request information sent from the recorder 3. Accordingly, it is possible to suppress power consumption by shortening a period of time for which the sleep state of the input device 2 is released. For example, even if the input device 2 is driven by using a battery, it is possible to use the input device 2 for a long time.

Figure 18:
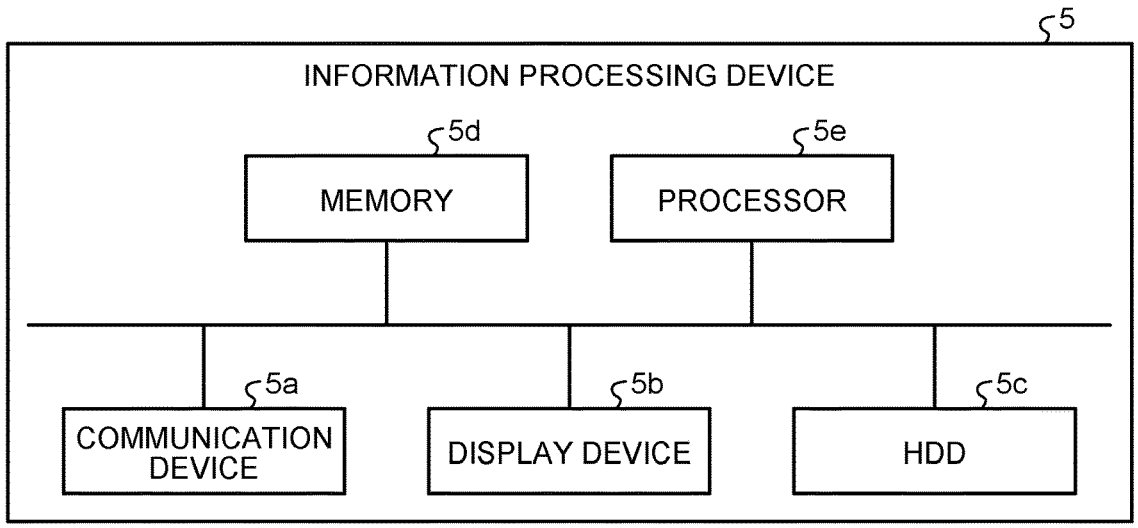
FIG. 18 is a diagram illustrating an example of a hardware configuration of the information processing device.

FIG. 18 is a diagram illustrating an example of a hardware configuration of the information processing device. A computer or the like having the exemplified hardware configuration functions as the information processing device 5 described above. The exemplified hardware configuration includes a communication device 5a, a display device 5b, a hard disk drive (HDD) 5c, a memory 5d, and a processor 5e that are connected with each other by a bus or the like.

The communication device 5a is a network interface card or the like, and enable communication with another device.

The display device 5b is, for example, a touch panel, a display, or the like. The HDD 5c functions as the storage unit 55 and stores therein, for example, the program 55a.

The processor 5 reads the program 55a from the HDD 5c or the like and loads the program 55a into the memory 5d, thereby allowing the computer to function as the information processing device 5. The function includes the functions of the monitoring unit 51, the list management unit 52, the generating unit 53, and the UI unit 54 that are described above.

The program 55a is able to be distributed via a network, such as the Internet. Furthermore, the program 55a is stored in a computer tradable storage medium, such as a hard disk, a flexible disk (FD), a CD-ROM, a magneto-optical disk (MO), and a digital versatile disk (DVD), and executed by being read from the recording medium by the computer.

The device, such as the recorder 3, other than the information processing device 5 may also have the same hardware configuration as that described above.

In the above, one embodiment of the present disclosure has been described; however, the disclosed technology is not limited to the embodiment described above.

The arrangements of each of the functions of the recorder 3, the server device 4, and the information processing device 5 may appropriately be changed. For example, at least a part of the function of the information processing device 5 may be incorporated into the recorder 3. At least a part of the function of the server device 4 may be incorporated into the recorder 3.

In the embodiment described above, an example in which a single piece of the recorder 3 is provided in combination with the plurality of input devices 2 has been described. However, a combination of an arbitrary number of the input devices 2 and an arbitrary number of the recorders 3 may be used. For example, a combination of a single piece of the input device 2 and a single piece of the recorder 3 may also be provided.

In the embodiment described above, an example in which transmission and reception performed by the communication unit 22 included in the input device 2 and transmission and reception performed by the communication unit 31 included in the recorder 3 are wireless transmission and reception have been described. However, these transmission and reception may also be wired transmission and reception.

In the embodiment described above, an example in which the recording unit 33 included in the recorder 3 generates the backfill data file 53a, independently of the recording data file 33a, as the new recording data in which the missing data has been complemented. However, the recording unit 33 may also generate new recording data by directly correct the recording data file 33a such that the missing data in the recording data file 33a is complemented.

The process performed by the information processing device 5 may also be implemented by cloud computing or the like. For example, a part or all of the functions of the monitoring unit 51, the list management unit 52, the generating unit 53, and the storage unit 55 included in the information processing device 5 may be provided in an external device outside the information processing device 5. The information processing device 5 may perform the processes described above by communicating with the external device.

The information processing system 1 described above is specified as follows, for example. As described with reference to FIG. 1 to FIG. 17, the information processing system 1 includes the input device 2, the recorder 3, and the information processing device 5. The input device 2 holds the measurement data and transmits the measurement data to the recorder 3 (Step S2). The recorder 3 receives the measurement data transmitted by the input device 2 and records the measurement data (Step S11 and Step S12). The information processing device 5 generates a new recording result (the backfill data file 53a) in which the missing data has been complemented by using the recording result (the recording data file 33a) obtained by the recorder 3 and using the complementary data (the complementary data file 34a) that corresponds to the measurement data that is not included in the recording result obtained by the recorder 3 but that is held by the input device 2 (Step S24 and Step S26). The recorder 3 transmits, to the input device 2, the request information that requests the complementary data (Step S14). The input device 2 receives the request information transmitted by the recorder 3, and then, transmits the requested complementary data to the recorder 3 (Step S5). The information processing device 5 generates a new recording result by using the complementary data that is transmitted by the input device 2 to the recorder 3 (Step S24 and Step S26).

According to the information processing system 1 described above, the recorder 3 transmits the request information for requesting the complementary data that includes the missing data to the input device 2, and the input device 2 transmits the requested complementary data to the recorder 3. The information processing device 5 generates a new recording result in which the missing data has been complemented by using that complementary data. In this way, it is possible to reduce the work burden placed on the acquisition and complement of the missing data as a result of acquisition and complement of the missing data being automatically performed.

As described above with reference to FIG. 3, FIG. 7, FIG. 14, and the like, the input device 2 holds the pieces of measurement data in association with the data sequence numbers that are assigned in the order of measurement, and transmits the measurement data to the recorder 3 together with the data sequence numbers; the complementary data includes the pieces of measurement data that are measured before and after the measurement of the missing data; and the information processing device 5 combines the recording result obtained by the recorder 3 and the complementary data such that the data sequence numbers of the pieces of measurement data measured before and after the measurement are matched with the data sequence numbers in the recording result, whereby the new recording result may be generated. As a result, for example, it is possible to ensure sufficient complementary data and it is thus possible to complement the missing data without omission as compared to a case in which only the measurement data obtained after detection of the missing data is used as the complementary data.

As described above with reference to FIG. 14 and the like, the information processing device 5 may combine the recording result obtained by the recorder 3 and the complementary data such that the missing data included in the complementary data is associated with the time that is equally allocated to the missing period of the occurrence of the missing data in the recording result obtained by the recorder 3. As a result, for example, even when the input device 2 and the recorder 3 are not operated in time synchronized, it is possible to complement the missing data associated with the time information while absorbing (correcting) an error (for example, an operation clock error) caused by an asynchronous state with respect to time.

As described above with reference to FIG. 17, if the information processing device 5 monitors the recording result of the recorder 3 (Step S21), and finds a recording result including the missing occurrence information, the information processing device 5 may generate a new recording result by using the recording result and the complementary data (Step S22 to Step S24). It is possible to further reduce a work burden by automatically monitoring, in this way, whether the missing data is present.

As described above with reference to FIG. 2, FIG. 4, FIG. 16, and the like, transmission and reception performed by the input device 2 and transmission and reception performed by the recorder 3 are wireless transmission and reception; the input device 2 is configured to be able to shift to the sleep state that includes a state in which electrical power of wireless transmission and reception is reduced and is also configured to be able to release the sleep state; the input device 2 transmits, to the recorder 3, the reception available notification for notifying that the request information is able to be received (Step S4); the recorder 3 transmits the request information to the input device 2 in accordance with reception of the reception available notification transmitted by the input device 2 (Step S14); and the input device 2 receives the request information transmitted by the recorder 3, and may shift to the sleep state after the input device 2 transmits the requested complementary data to the recorder (Step S5 and Step S6). As a result, it is possible to suppress an increase in power consumption of the input device 2 caused by, in particular, a wireless reception function held by the input device 2. For example, even if the input device 2 is driven by using a battery, it is possible to use the input device 2 for a long time.

The input device 2 described with reference to FIG. 1 to FIG. 9, FIG. 16, and the like is also one of the embodiments. The input device 2 includes the storage unit 24 that holds the measurement data; and the communication unit 22 that transmits the measurement data to the recorder 3 that records the measurement data, wherein the communication unit 22 receives, from the recorder 3, the request information for requesting the complementary data that includes the missing data corresponding to the measurement data that is not included in the recording result obtained by the recorder 3 but that is held by the storage unit 24, and then, transmits the requested complementary data to the recorder 3 (Step S5). With the input device 2 configured in this way, as described above, it is also possible to reduce a work burden placed on acquisition and complement of the missing data.

The recorder 3 described with reference to FIG. 1 to FIG. 9, FIG. 16, and the like is also one of the embodiments. The recorder 3 includes the communication unit 31 that receives the measurement data transmitted by the input device 2 that holds the measurement and that also transmits the measurement; and the recording unit 33 that records the measurement data received by the communication unit 31, wherein the communication unit 31 transmits, to the input device, the request information for requesting the complementary data that includes the missing data corresponding to the measurement data that is not included in the recording result obtained by the recording unit 33 but that is held by the input device 2 (Step S14). With the recorder 3 configured in this way, as described above, it is also possible to reduce a work burden placed on acquisition and complement of the missing data.

The program 55a described with reference to FIG. 11, FIG. 15 to FIG. 18, and the like is also one of the embodiments. The program 55a is an information processing program that causes a computer to execute a process of generating a new recording result (the backfill data file 53a) in which the missing data has been complemented by using the recording result (the recording data file 33a) obtained by the recorder 3 that receives and records the measurement data transmitted by the input device 2 that holds and transmits the measurement data and by using the complementary data (the complementary data file 34a) that includes the missing data that corresponds to the measurement data that is not included in the recording result obtained by the recorder 3 but that is held by the input device 2 (Step S24 and Step S26), wherein the recorder 3 transmits, to the input device 2, the request information for requesting the complementary data (Step S14); the input device 2 receives the request information transmitted by the recorder 3, and transmits the requested complementary data to the recorder 3 (Step S5); and the process of generating the new recording result includes generating the new recording result by using the complementary data that is transmitted to the recorder 3 by the input device 2 (Step S24 and Step S26). With the program 55a configured in this way, as described above, it is also possible to reduce a work burden placed on acquisition and complement of the missing data. Furthermore, as described with reference to FIG. 18, and the like, the recording medium in which the information processing program (the program 55a) is stored is one of the embodiments.

The information processing method described with reference to FIG. 16, FIG. 17, and the like is also one of the embodiments. The information processing method includes a method of holding, performed by the input device 2, the measurement data and transmitting, performed by the input device 2, the measurement data to the recorder 3 (Step S2); a method of receiving and recording, performed by the recorder 3, the measurement data transmitted by the input device 2 (Step S11 and Step S12); and a method of generating, performed by the information processing device 5, a new recording result (the backfill data file 53a) in which the missing data has been complemented by using the recording result (the recording data file 33a) obtained by the recorder 3 and the complementary data (the complementary data file 34a) that includes the missing data that corresponds to the measurement data that is not included in the recording result obtained by the recorder 3 but that is held by the input device 2 (Step S24 and Step S26), wherein the generating includes generating the new recording result by using the complementary data obtained by transmitting, performed by the recorder 3, request information for requesting the complementary data to the input device 2, and by transmitting, performed by the input device 2, the complementary data to the recorder 3 in accordance with the request information (Step S24 and Step S26). With the information processing method configured in this way, as described above, it is also possible to reduce a work burden placed on acquisition and complement of the missing data.

What is claimed is:

1. An information processing system comprising:
   an input device that holds measurement data and that transmits the measurement data to a recorder;
   the recorder that receives and records the measurement data transmitted by the input device; and
   an information processing device that generates, by using a recording result obtained by the recorder and complementary data that includes missing data corresponding to measurement data that is not included in the recording result obtained by the recorder but that is held by the input device, a new recording result in which the missing data has been complemented, wherein the recorder transmits request information for requesting the complementary data to the input device at a predetermined timing, the input device receives the request information transmitted by the recorder and transmits the requested complementary data to the recorder, the information processing device generates the new recording result by using the complementary data transmitted to the recorder by the input device, the input device holds the measurement data in association with data sequence numbers that are assigned in order of measurement and transmits the measurement data to the recorder together with the data sequence numbers, the complementary data includes pieces of measurement data measured before and after the measurement of the missing data, and the information processing device generates the new recording result by combining the recording result obtained by the recorder and the complementary data in a manner such that the data sequence numbers of the pieces of measurement data measured before and after the measurement of the missing data are matched with the data sequence numbers indicated by the recording result, and then the measurement data located between the matched data sequence numbers in the recording result are complemented with the missing data included in the complementary data.

2. The information processing system according to claim 1, wherein the information processing device combines the recording result obtained by the recorder and the complementary data such that the missing data included in the complementary data is associated with time that is equally allocated to a missing period for which the missing data occurs in the recording result obtained by the recorder.

3. The information processing system according to claim 1, wherein the input device holds the measurement data in association with the data sequence numbers that are assigned in order of the measurement and transmits the measurement data to the recorder together with the data sequence numbers, the recorder records the measurement data in association with the data sequence numbers and missing occurrence information that indicates presence of the missing data, and the information processing device monitors the recording result obtained by the recorder and generates, when the information processing device finds the recording result including the missing occurrence information, the new recording result by using the found recording result and the complementary data.

4. The information processing system according to claim 1, wherein transmission and reception performed by the input device and transmission and reception performed by the recorder are wireless transmission and reception, the input device is configured to be able to shift to a sleep state that includes a state, in which power consumption of the wireless transmission and reception is reduced, and is also configured to be able to release the sleep state, the input device transmits, to the recorder, a reception available notification for notifying that the request information is able to be received, the recorder transmits the request information to the input device in response to the reception of the reception available notification transmitted by the input device, and the input device receives the request information transmitted by the recorder and shifts to the sleep state after the input device transmits the requested complementary data to the recorder.

5. A computer-readable recording medium having stored therein an information processing program that causes a computer to execute a process comprising:

generating, by using a recording result obtained by a recorder that receives and records measurement data that is transmitted by an input device that holds and transmits the measurement data, and by using complementary data that includes missing data corresponding to measurement data that is not included in the recording result obtained by the recorder but that is held by the input device, a new recording result in which the missing data has been complemented, wherein the recorder transmits, to the input device, request information for requesting the complementary data at a predetermined timing, the input device receives the request information transmitted by the recorder and transmits the requested complementary data to the recorder, the generating includes generating the new recording result by using the complementary data transmitted to the recorder by the input device, the input device holds the measurement data in association with data sequence numbers that are assigned in order of measurement and transmits the measurement data to the recorder together with the data sequence numbers, the complementary data includes pieces of measurement data measured before and after the measurement of the missing data, and the generating includes generating the new recording result by combining the recording result obtained by the recorder and the complementary data in a manner such that the data sequence numbers of the pieces of measurement data measured before and after the measurement of the missing data are matched with the data sequence numbers indicated by the recording result, and then the measurement data located between the matched data sequence numbers in the recording result are complemented with the missing data included in the complementary data.

6. An information processing method comprising:

holding, performed by an input device, measurement data and transmitting, performed by an input device, the measurement data to a recorder;

receiving and recording, performed by the recorder, the measurement data transmitted by the input device; and generating, performed by an information processing device, by using a recording result obtained by the recorder and complementary data that includes missing data corresponding to measurement data that is not included in the recording result obtained by the recorder but that is held by the input device, a new recording result in which the missing data has been complemented, wherein the generating includes generating the new recording result by using the complementary data obtained by transmitting at a predetermined timing, performed by the recorder, request information for requesting the complementary data to the input device, and by transmitting, performed by the input device, the complementary data to the recorder in accordance with the request information, the input device holds the measurement data in association with data sequence numbers that are assigned in order of measurement and transmits the measurement data to the recorder together with the data sequence numbers, the complementary data includes pieces of measurement data measured before and after the measurement of the missing data, and the generating includes generating the new recording result by combining the recording result obtained by the recorder and the complementary data in a manner such that the data sequence numbers of the pieces of measurement data measured before and after the measurement of the missing data are matched with the data sequence numbers indicated by the recording result, and then the measurement data located between the matched data sequence numbers in the recording result are complemented with the missing data included in the complementary data.

\* \* \* \* \*